United States Patent
Oh et al.

(10) Patent No.: US 6,508,082 B2
(45) Date of Patent: Jan. 21, 2003

(54) METHOD FOR FABRICATING HIGH-PURITY SILICA GLASS USING SOL-GEL PROCESSING

(75) Inventors: Jeong-Hyun Oh, Daegu-kwangyokshi (KR); Mi-Kyung Lee, Ansan-shi (KR)

(73) Assignee: Samsung Electronics Co. LTD, Suwon (KR)

( * ) Notice: Subject to any disclaimer, the term of this patent is extended or adjusted under 35 U.S.C. 154(b) by 51 days.

(21) Appl. No.: 09/739,159

(22) Filed: Dec. 18, 2000

(65) Prior Publication Data

US 2001/0003910 A1 Jun. 21, 2001

(30) Foreign Application Priority Data

Dec. 16, 1999 (KR) .............................. 99-58144

(51) Int. Cl.$^7$ ................................. C03B 8/00
(52) U.S. Cl. .................... 65/17.2; 65/395; 65/396; 501/12; 423/338
(58) Field of Search .................. 65/17.2, 395, 396; 501/12; 423/338

(56) References Cited

U.S. PATENT DOCUMENTS

| | | | | |
|---|---|---|---|---|
| 4,943,542 A | * | 7/1990 | Hayashi et al. | |
| 5,240,488 A | | 8/1993 | Chandross et al. | .......... 65/3.11 |
| 5,919,280 A | * | 7/1999 | Oh et al. | |
| 6,132,649 A | * | 10/2000 | Cauda et al. | |

* cited by examiner

Primary Examiner—Michael Colaianni
(74) Attorney, Agent, or Firm—Steve Cha; Cha & Reiter

(57) ABSTRACT

Disclosed is a method for fabricating high-purity silica glass using a sol-gel processing that includes the steps of: (a) mixing deionized water with a monomer and a dimer to prepare an aqueous premix solution; (b) mixing the aqueous premix solution with a fused silica and a dispersion agent; (c) mixing the resulting mixture to form a dispersed sol; (d) aging the dispersed sol at the ambient temperature to stabilize silica particles, and removing air voids from the sol; and, (e) adding a polymerization initiator and a gelation agent to the aged sol.

11 Claims, 1 Drawing Sheet

METHOD FOR FABRICATING HIGH-PURITY SILICA GLASS USING SOL-GEL PROCESSING

CLAIM OF PRIORITY

This application makes reference to and claims all benefits accruing under 35 U.S.C. Section 119 from an application entitled, "Method for Fabricating High-Purity Silica Glass Using Sol-Gel Processing", filed in the Korean Industrial Property Office on Dec. 16, 1999 and there duly assigned Serial No. 99-58144.

BACKGROUND OF THE INVENTION

1. Field of the Invention

The present invention relates generally to a method for fabricating silica glass, and in particular, to a method for fabricating high-purity silica glass using a sol-gel process.

2. Description of the Related Art

Silica glass, which is a raw material of high-purity glass articles, has been useful for optical devices, such as optical fiber and photomask for semiconductor. Silica glass is generally manufactured using a natural quartz process, synthetic quartz process, or sol-gel process. Basically, the sol-gel process involves the technique of securing high-purity silica glass using a high purity material as the starting material. When the sol-gel process is used as a liquid phase process, high productivity can be achieved and the composition of the product can be controlled easily compared to other processes. Also, the sol-gel process is economical because almost all steps except sintering are carried out at a low temperature.

A known fabrication method of silica glass using the sol-gel processing is disclosed in detail in U.S. Pat. No. 5,240,488, entitled "Manufacture of vitreous silica product via a sol-gel process using a polymer additive".

In the fabrication of silica glass using the sol-gel processing, there are various factors including temperature, composition, pressure, acidity and solvency which have an adverse effect in the transition of sol to gel as well as in the strength of the gel. To overcome this problem, many attempts have been made to secure the flexibility and strength of the gel while preventing cracks that may occur in the drying process. Unfortunately, it is a continuing problem to prevent many cracks when drying the molded gel and during sintering.

SUMMARY OF THE INVENTION

It is, therefore, an object of the present invention to provide a method for fabricating high purity silica glass using a sol-gel process, in which cracking during the drying process is minimized.

Accordingly, to achieve the above objective, there is provided a method for fabricating high-purity silica glass using a sol-gel process comprising the steps of: (a) mixing deionized water with a monomer and a dimer to prepare an aqueous premix solution; (b) mixing the aqueous premix solution with a fused silica and a dispersion agent; (c) mixing the resulting mixture to form a dispersed sol; (d) aging the dispersed sol at an ambient temperature to stabilize silica particles, and removing air voids from the sol; and (e) adding a polymerization initiator and a gelation agent to the aged sol.

BRIEF DESCRIPTION OF THE DRAWINGS

The above objective and advantages of the present invention will become more apparent from the following detailed description when taken in conjunction with the accompanying drawings in which.

DETAILED DESCRIPTION OF THE PREFERRED EMBODIMENT

Figure 1:
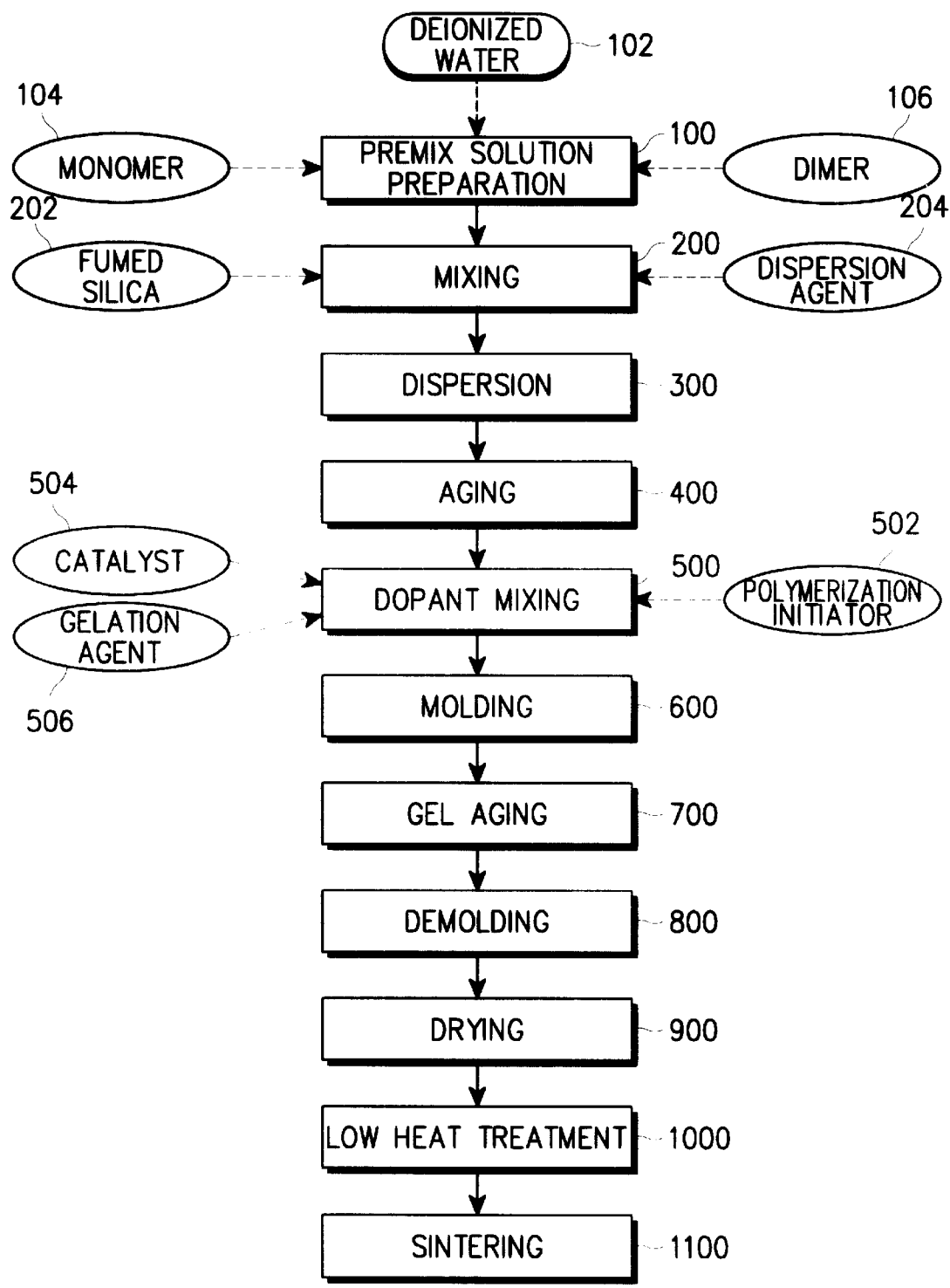
FIG. 1 is a flow chart illustrating the process for fabricating high-purity silica glass using a sol-gel processing according to the present invention.

The present invention is directed to a method for fabricating high-purity silica glass using sol-gel processing which enables the production of large-sized silica glass with enhanced plasticity and minimize cracking during the drying process. For the purpose of clarity, detailed descriptions of well-known devices and methods are omitted so as not to obscure the description of the present invention with unnecessary detail.

FIG. 1 is a flow chart showing a method for fabricating high-purity silica glass using a sol-gel process according to the present invention. As shown in FIG. 1, the inventive method includes the steps of: preparing aqueous premix solution (step 100); mixing fumed silica and a dispersion agent to the premix solution (step 200); dispersing the mixed solution (step 300); aging the mixed solution (step 400); dopant mixing by adding a polymerization initiator and a catalyst to the aged sol (step 500); pouring the reaction mixture into a mold (step 600); aging the obtained gel (step 700); demolding the aged gel (step 800); drying the demolded gel (step 900); applying low heat treatment to remove organic substances from the dried gel (step 1000) and, performing a sintering reaction on the gel (step 1100).

Unlike the conventional method where a polymer is added as a binder to the aqueous premix solution of silica and deionized water, the present invention method for fabricating high-purity silica glass using a sol-gel process uses a monomer to prepare an aqueous premix solution, mixes the aqueous premix solution with a fumed silica, subjects the mixture to dispersion and aging to form a sol, which is then mixed with a polymerization initiator to convert the monomer to a polymer.

More specifically, the preparation of an aqueous premix solution in step 100 involves mixing deionized water 102 with a monomer 104 and a dimer 106. The monomer 104 is converted to a polymer in the dopant mixing step 500 (described in detail later). The monomer 104 acts as a binder that secures the association between the silica particles of the sol and provides flexibility for the sol. The amount of the monomer 104 is in the range of 2 to 20 wt. % based on the total weight of a fumed silica 202 that will be added later. For example, when fumed silica of 100 g is added, 2–20 g of monomer is added. Such a low content of the monomer 104 in the aqueous premix solution prevents carbon or other substances to remain during the degradation of organic substances and lowers the turbidity of the vitreous silica glass after the sintering process. The monomer 104 is preferably 1-vinyl-2-pyrrolidinone. The dimer 106 acts as a cross-linking agent to stabilize the structure of the sol. The weight of dimer is 2–20% of the premix solution. The dimer 106 is preferably N,N'-methylenebisacrylamide.

The mixing step 200 involves mixing the aqueous premix solution with a fumed silica 202 and a dispersion agent 204. The amount of the fumed silica added to the total solution is in the range of 40 to 60 wt. %. The dispersion agent 204 is preferably tetramethylammonium hydroxide, and the pH of the reaction mixture is adjusted to 11–13 thereby enhancing the dispersability of the silica particles. The dispersion step 300 involves mixing the mixture obtained in the mixing step 200 to form a dispersed sol. This step can be carried out in a high shear mixer.

The aging step 400 involves aging the sol obtained in step 300 at ambient for a predetermined time and removing the air voids or air bubbles contained in the sol using a vacuum pump. This step 400 stabilizes the silica particles of the sol.

The dopant mixing step 500 involves adding a polymerization initiator 502 and a gelation agent 506 to the sol with air voids removed therefrom. This step 500 causes the polymerization reaction of the monomer 104 contained in the sol to establish the three-dimensional structure binding of the silica particles together, and increases the strength of the wet gel so as to prevent the formation of cracks during the shorter drying process. The gelation agent 506 is further added to control the acidity of the sol, and also enhances the gelation of the sol so that the gelation of the sol can occur in combination with the polymerization reaction of the monomers 104 in enhancing the strength of the wet gel. The polymerization initiator 502 is preferably ammonium persulfate. Examples of the gelation agent 506 include methyl formnate, methyl lactate and ethyl lactate, which can be used alone or in combination. In addition, the dopant mixing step 500 involves additing a catalyst 504 for promoting the polymerization reaction of the monomer 104 in the sol. The catalyst 504 is preferably N,N,N',N'-tetramethylethylenediamine.

The molding step 600 includes pouring the sol after the dopant mixing step 500 into a mold of a defined shape, and subjecting the sol to polymerization reaction and gelation.

The gel aging step 700 involves removing the core rod from the mold and aging the tube-like molded gel so as to increase the strength of the gel. The aging process is performed at a relative humidity level of 75% and at around 30° C.

The demolding step 800 separates the wet gel from the mold. In some cases, this step 800 can be carried out using the water pressure in a water bath in order to prevent damage to the wet gel.

Next, the drying step 900 involves drying the wet gel separated from the mold in the demolding step 800 at 30° C. and at a relative humidity level of 75% in a humidity chamber to form a dry gel.

The low heat treatment application in step 1000 involves heat treatment to the dry gel under a gas atmosphere (i.e., chlorine, hydrogen, or oxygen) to decompose the residual water and organic substance (i.e., in the binder in the dry gel) and remove metallic impurities and hydroxyl groups (OH). Accordingly, step 1000 removes any impurities from the dry gel as described above and is also sometimes referred to as a "purification step". The heat treatment is performed at 300–600° C. at a heating rate of 50° C./hr for 3 hours.

Lastly, the sintering step 1100 is performed to sinter the dry gel, which has undergone a low heat treatment 1000, into vitreous gel at a relatively high temperature and produces the final high-purity silica glass. The dry gel was placed in a sintering furnace and kept at the raised temperature of 900° C. at the heating rate of 100° C./hr for 2 hours, then the dry heat is heated to 1400° C. at the heating rate of 100° C./hr under the helium (He) atmosphere for one hour. The heating furnace was translated up and down, thereby forming a high-purity bar-shaped silica glass. Here, the silica glass as obtained in the present invention takes the shape of a substrate tube of an overjacketing tube.

The invention will be further described in detail by the examples below. However, these examples do not impose limitations on the scope of the invention.

EXAMPLE 1

2.825 g of deionized water was mixed with 108 g of 1-vinyl-2-pyrrolidinone and 12 g of N N'-methylenebisacrylamide to prepare an aqueous mixed solution, which was then mixed with 375 cc of an aqueous solution containing 25 wt. % of tetramethylammonium hydroxide. After addition of a fused silica (Aerosil-OX50, Degussa Co.), the mixture was dispersed with a high shear mixer to form a sol.

Subsequently, the sol separated from the mixer was aged at 18° C. for 10 hours. 5000 g of the aged sol weighed and air voids were removed using a vacuum pump. To the aged sol were added 60 cc of 5 wt. % ammonium persulfate, 10 cc of N,N,N',N'-tetramethyethylenediamine and 90 cc of ethyl lactate.

After a second removal of air voids, the sol was poured into a mold to provide a molded wet gel. This wet gel was separated from the mold and dried in a humidity chamber at 30° C. and at a relative humidity level of 75% to obtain a dry gel. The dry gel was then subjected to the heat treatment in the temperature range of 300–600° C. at the heating rate of 50° C./hr for 3 hours in order to eliminate residual water and additives from the dry gel.

After the heat treatment, dry gel was placed in a sintering furnace and kept at the raised temperature of 900° C., at the heating rate of 100° C./hr for 2 hours. As such, the chlorine gas was supplied into the sintering furnace to remove the residual hydroxyl group (OH) from the dry gel. Subsequently, the sintering furnace was heated to 1400° C. at the heating rate of 100° C./hr under the helium (He) atmosphere for one hour to obtain high purity silica glass without air void.

EXAMPLE 2

25 g of glycerin is added as a plasticizer to the sol in step 200 of Example 1. The subsequent procedures were performed in the same manner as described in Example 1.

EXAMPLE 3

2.825 g of deionized water was mixed with 135 g of 1-vinyl-2-pyrrolidinone and 15 g of N,N'-methylenebisacrylamide to prepare an aqueous mixed solution, which was then mixed with 375 cc of an aqueous solution containing 25 wt. % of tetramethylammonium hydroxide. After adding a fused silica (Aerosil-OX50, Degussa), the mixture was dispersed with a high shear mixer to form a sol.

Subsequently, the sol separated from the mixer was aged at 18° C. for 10 hours. 5000 g of the aged sol weighted and air voids were removed using a vacuum pump. To the aged sol were added 55 cc of 5 wt. % ammonium persulfate, 8 cc of N,N,N',N'-tetramethylethylenediamine, and 90 cc of ethyl lactate.

After a second removal of air voids, the sol was poured into a mold to provide a molded wet gel. This wet gel was separated from the mold and dried in a humidity chamber at 30° C. and at a relative humidity level of 75% to obtain a dry gel. The dry gel was then subjected to the heat treatment in the temperature range of 300–600° C. at the heating rate of 50° C./hr for 3 hours in order to eliminate residual water and additives from the dry gel.

The dry gel after the heat treatment was placed in a sintering furnace and kept at a raised temperature of 900° C., at the heating rate of 100° C./hr for 2 hours. As such, the chlorine gas was supplied into the sintering furnace to remove the residual hydroxyl group (OH) from the dry gel. Subsequently, the sintering furnace was heated to 1400° C. at the heating; rate of 100° C./hr under the helium (He) atmosphere for one hour to obtain high purity silica glass without air void.

EXAMPLE 4

25 g of glycerin was added to the sol in step 200 of Example 3. The subsequent procedures were performed in the same manner as described in Example 3.

As described above, the method for fabricating high-purity silica glass using a sol-gel process according to the embodiment of the present invention adds a monomer to the aqueous premix solution to disperse the silica particles and converts the monomer to a polymer acting as a binder of the silica particles. As a result, the distribution of the binder in the gel is uniform irrespective of the local gradient, and the strength of the gel is increased to effectively inhibit formation of cracks during the drying step.

Furthermore, the present invention method enables the production of high-purity silica glass from a low-purity fumed silica and secures high strength of the wet gel, thus allowing the production of large-sized silica glass.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for fabricating high-purity silica glass using a sol-gel processing, comprising the steps of:
   (a) mixing deionized water with a 1-vinyl-2-pyrrolidinone and a dimer to prepare an aqueous premix solution;
   (b) mixing the aqueous premix solution with a fumed silica and a dispersion agent;
   (c) mixing the resulting mixture to form a dispersed sol;
   (d) aging the dispersed sol at an ambient temperature to stabilize silica particles, and for removing air voids from the sol; and,
   (e) adding a dopant mixture of a polymerization initiator, a catalyst, and a gelation agent to the aged sol.

2. The method as claimed in claim 1, wherein the dimer added in step (a) of the aqueous premix solution is N,N'-methylenebisacrylamide.

3. The method as claimed in claim 1, wherein the dispersion agent added in step (b) is tetramethylammonium hydroxide.

4. The method as claimed in claim 1, wherein the polymerization initiator added in step (e) is ammonium sulfate.

5. The method as claimed in claim 1, wherein the gelation agent added in step (e) is selected from a group consisting of methyl formate, methyl lactate, and ethyl lactate.

6. The method as claimed in claim 1, wherein the catalyst added in step (e) is N,N,N',N'-tetramethylethylenediamine.

7. The method as claimed in claim 1, wherein the amount of 1-vinyl-2-pyrrolidinone added in the preparation step (a) of the aqueous premix solution is 2 to 20 wt. % based on the weight of the fumed silica.

8. The method as claimed in claim 1, wherein step (d) of aging the dispersed sol is performed at the temperature of 18° C. for 10 hours.

9. The method as claimed in claim 1, further comprising the steps of:
   (f) pouring the dopant mixture obtained in step (e) into a mold to form a gel;
   (g) aging the gel obtained in step (f);
   (h) demolding the aged gel;
   (i) drying the demolded gel;
   (j) applying heat treatment to the dried gel to remove organic substances from the dried gel; and,
   (k) sintering the heated gel.

10. The method as claimed in claim 9, wherein step (i) of drying is performed in a humidity chamber at 30° C. and at a relative humidity level of 75%.

11. The method as claimed in claim 9, wherein the heat treatment application step(i) is performed at temperature range of 300–600° C. at a heating rate of 50° C./hr for 3 hours.

* * * * *